United States Patent
Nagahara

(10) Patent No.: US 10,151,906 B2
(45) Date of Patent: Dec. 11, 2018

(54) IMAGING OPTICAL SYSTEM, PROJECTION-TYPE DISPLAY APPARATUS, AND IMAGING APPARATUS

(71) Applicant: FUJIFILM Corporation, Tokyo (JP)

(72) Inventor: Akiko Nagahara, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/603,005

(22) Filed: May 23, 2017

(65) Prior Publication Data

US 2017/0343779 A1    Nov. 30, 2017

(30) Foreign Application Priority Data

May 25, 2016  (JP) ................................. 2016-104123

(51) Int. Cl.
| | |
|---|---|
| *G02B 3/00* | (2006.01) |
| *G02B 13/16* | (2006.01) |
| *G02B 27/28* | (2006.01) |
| *G02B 9/64* | (2006.01) |
| *G02B 13/04* | (2006.01) |

(52) U.S. Cl.
CPC ............. *G02B 13/16* (2013.01); *G02B 9/64* (2013.01); *G02B 13/04* (2013.01); *G02B 27/283* (2013.01)

(58) Field of Classification Search
CPC ........ G02B 13/00; G02B 13/24; G02B 13/26; G02B 17/00; G02B 17/02; G02B 17/04; G02B 17/06; G02B 17/08; G02B 17/0852; G02B 17/0884; G02B 13/16; G02B 9/64

See application file for complete search history.

(56) References Cited

U.S. PATENT DOCUMENTS

| | | | | |
|---|---|---|---|---|
| 9,869,849 | B2* | 1/2018 | Amano | G02B 13/16 |
| 2004/0223123 | A1* | 11/2004 | Engle | G02B 13/06 |
| | | | | 353/69 |
| 2014/0036142 | A1* | 2/2014 | Inoko | G02B 3/00 |
| | | | | 348/369 |
| 2015/0036228 | A1* | 2/2015 | Nagahara | G02B 13/04 |
| | | | | 359/708 |
| 2015/0077848 | A1* | 3/2015 | Ichimura | G02B 13/16 |
| | | | | 359/434 |
| 2015/0234157 | A1* | 8/2015 | Ichimura | G02B 13/16 |
| | | | | 359/434 |
| 2017/0351070 | A1* | 12/2017 | Shiokawa | G02B 15/22 |

FOREIGN PATENT DOCUMENTS

JP        2006-523318 A      10/2006

* cited by examiner

*Primary Examiner* — Thong Nguyen
(74) *Attorney, Agent, or Firm* — Studebaker & Brackett PC

(57) ABSTRACT

An imaging optical system consists of a first optical system and a negative second optical system in order from a magnified side. The second optical system forms an intermediate image, and the first optical system forms the intermediate image on a magnified-side conjugate plane. The second optical system consists of a positive front group and a back group in order from the magnified side. Predetermined conditional expressions are satisfied.

15 Claims, 10 Drawing Sheets

EXAMPLE 1

EXAMPLE 2

EXAMPLE 3

EXAMPLE 3

IMAGING OPTICAL SYSTEM, PROJECTION-TYPE DISPLAY APPARATUS, AND IMAGING APPARATUS

CROSS REFERENCE TO RELATED APPLICATIONS

The present application claims priority under 35 U.S.C. § 119 to Japanese Patent Application No. 2016-104123 filed on May 25, 2016. The above application is hereby expressly incorporated by reference, in its entirety, into the present application.

BACKGROUND OF THE INVENTION

1. Field of the Invention

The present invention relates particularly to an imaging optical system which is suitably used for a projection-type display apparatus having a light valve such as a liquid crystal display device or a Digital Micromirror Device (DMD: Registered Trademark) mounted therein, a projection-type display apparatus including this imaging optical system, and an imaging apparatus including this imaging optical system.

2. Description of the Related Art

In recent years, projection-type display apparatuses (also called projectors), such as a liquid crystal display device or a DMD, having a light valve mounted therein have been in widespread use and have increased in performance.

In recent years, with an improvement in the performance of a light valve, an imaging optical system which is combined with the light valve has required satisfactory aberration correction appropriate for the resolution of the light valve. In addition, with an increase in scenes which are projected onto a large-sized screen in a large hall, an exhibition or the like using a projection-type display apparatus, or scenes in which a larger screen size is required at a smaller projection distance, an imaging optical system having a wider angle is demanded. Further, since a magnified image shows conspicuous distortion, an imaging optical system capable of projecting an image having little distortion is required.

In order to respond to such a demand, an imaging optical system is proposed in which an intermediate image is formed in a reduced-side optical system consisting of a plurality of lenses, and the image is re-formed in a magnified-side optical system consisting of a plurality of lenses (see, for example, JP2006-523318A).

However, the optical system disclosed in JP2006-523318A does not have a sufficiently small F-Number. An imaging optical system having a small F-Number is required in order to realize a projection-type display apparatus having higher luminance.

SUMMARY OF THE INVENTION

The present invention is contrived in view of such circumstances, and an object thereof is to provide an imaging optical system which has a small F-Number and has satisfactory optical performance, a projection-type display apparatus including this imaging optical system, and an imaging apparatus including this imaging optical system.

According to the present invention, there is provided an imaging optical system capable of projecting an image displayed on an image display surface on a reduced-side conjugate plane, as a magnified image, onto a magnified-side conjugate plane, the system consisting of, in order from a magnified side: a first optical system which is constituted by a plurality of lenses; and a second optical system which is constituted by a plurality of lenses and has a negative refractive power as a whole, wherein the second optical system forms the image on the image display surface as an intermediate image, the first optical system forms the intermediate image on the magnified-side conjugate plane, the second optical system consists of a front group having a positive refractive power as a whole and a back group, in order from the magnified side, the back group is a lens group having the maximum number of lenses included, among lens groups in which its magnified-side focal position is located closer to the magnified side than its lens surface on a most magnified side, and all the following Conditional Expressions (1) to (3) are satisfied, $$4 < |fG2a/f| < 9 \tag{1}$$

$$1 < |f2/Im\varphi| < 8 \tag{2}$$

$$0.7 < |f/f1| < 1.1 \tag{3}$$

where fG2a is a focal length of the front group,
f is a focal length of the whole system,
f2 is a focal length of the second optical system,
Imφ is an effective image circle diameter on the reduced side, and
f1 is a focal length of the first optical system.

In the imaging optical system of the present invention, it is preferable to satisfy at least one of the following Conditional Expression (1-1), ..., or (3-1), $$4 < |fG2a/f| < 8 \tag{1-1}$$

$$1.5 < |f2/Im\varphi| < 8 \tag{2-1}$$

$$0.7 < |f/f1| < 1.05 \tag{3-1}$$

In the imaging optical system of the present invention, it is preferable to satisfy the following Conditional Expression (4), and more preferable to satisfy the following Conditional Expression (4-1), $$3 < TLG2/Im\varphi < 8 \tag{4}$$

$$3 < TLG2/Im\varphi < 7 \tag{4-1}$$

where TLG2 is a distance on an optical axis from a surface of the second optical system on the most magnified side to a surface thereof on a most reduced side, and
Imφ is an effective image circle diameter on the reduced side.

In the imaging optical system of the present invention, it is preferable to satisfy the following Conditional Expression (5), and more preferable to satisfy the following Conditional Expression (5-1), $$18 < Bf \times Im\varphi/f^2 < 100 \tag{5}$$

$$20 < Bf \times Im\varphi/f^2 < 100 \tag{5-1}$$

where Bf is a back focus of the whole system at air conversion length,
Imφ is an effective image circle diameter on the reduced side, and
f is a focal length of the whole system.

It is preferable that a lens of the second optical system of the imaging optical system of the present invention on the most magnified side is a positive lens. In such a case, it is preferable to satisfy the following Conditional Expression (6), and more preferable to satisfy the following Conditional Expression (6-1), $$1.55 < Nd2a < 2.2 \quad (6)$$

$$1.60 < Nd2a < 2.2 \quad (6\text{-}1)$$

where Nd2a is a refractive index relating to a d line of the lens of the second optical system on the most magnified side.

In the imaging optical system of the present invention, it is preferable to satisfy the following Conditional Expression (7), and more preferable to satisfy the following Conditional Expression (7-1), $$0.05 < Dmin/f1 < 10 \quad (7)$$

$$0.05 < Dmin/f1 < 5 \quad (7\text{-}1)$$

where Dmin is a distance on an optical axis between the intermediate image and a lens surface closest to the intermediate image, and f1 is a focal length of the first optical system.

According to the present invention, there is provided a projection-type display apparatus comprising: a light source; a light valve on which light from the light source is incident; and the imaging optical system of the present invention as an imaging optical system that projects an optical image of light optically modulated by the light valve onto a screen.

According to the present invention, there is provided an imaging apparatus comprising the imaging optical system of the present invention.

Meanwhile, in a case where the imaging optical system of the present invention is applied to the projection-type display apparatus, the term "magnified side" means a projected side (screen side), and the screen side is assumed to be referred to as the magnified side, for the sake of convenience, even in a case of reduction projection. On the other hand, the term "reduced side" means an original image display region side (light valve side), and the light valve side is assumed to be referred to as the reduced side, for the sake of convenience, even in a case of reduction projection.

In addition, regarding the term "back focus", the magnified side is considered to be a front side, and the reduced side is considered to be a back side.

Meanwhile the term "consist of" is intended to be allowed to include lenses having no practical power, optical elements, such as a reflecting member, a stop, a mask, cover glass, or a filter having no power, other than a lens, and the like, in addition to the things enumerated as components.

Meanwhile the terms "front group" and "back group" are assumed to include groups which are not only necessarily constituted by a plurality of lenses, but also constituted by only one lens. The sign of the refractive power of the lens group and the sign of the refractive power of the lens are assumed to be those in a paraxial region in a case where an aspherical surface is included. The above conditional expressions are based on the d line (wavelength of 587.6 nm).

According to the present invention, an optical system that consists of a first optical system and a second optical system in order from a magnified side and forms an intermediate image through the second optical system is configured to suitably set the configuration of the second optical system, and to satisfy predetermined conditional expressions. Therefore, it is possible to provide an imaging optical system which has a small F-Number and has satisfactory optical performance, a projection-type display apparatus including this imaging optical system, and an imaging apparatus including this imaging optical system.

DESCRIPTION OF THE PREFERRED EMBODIMENTS

Figure 1:
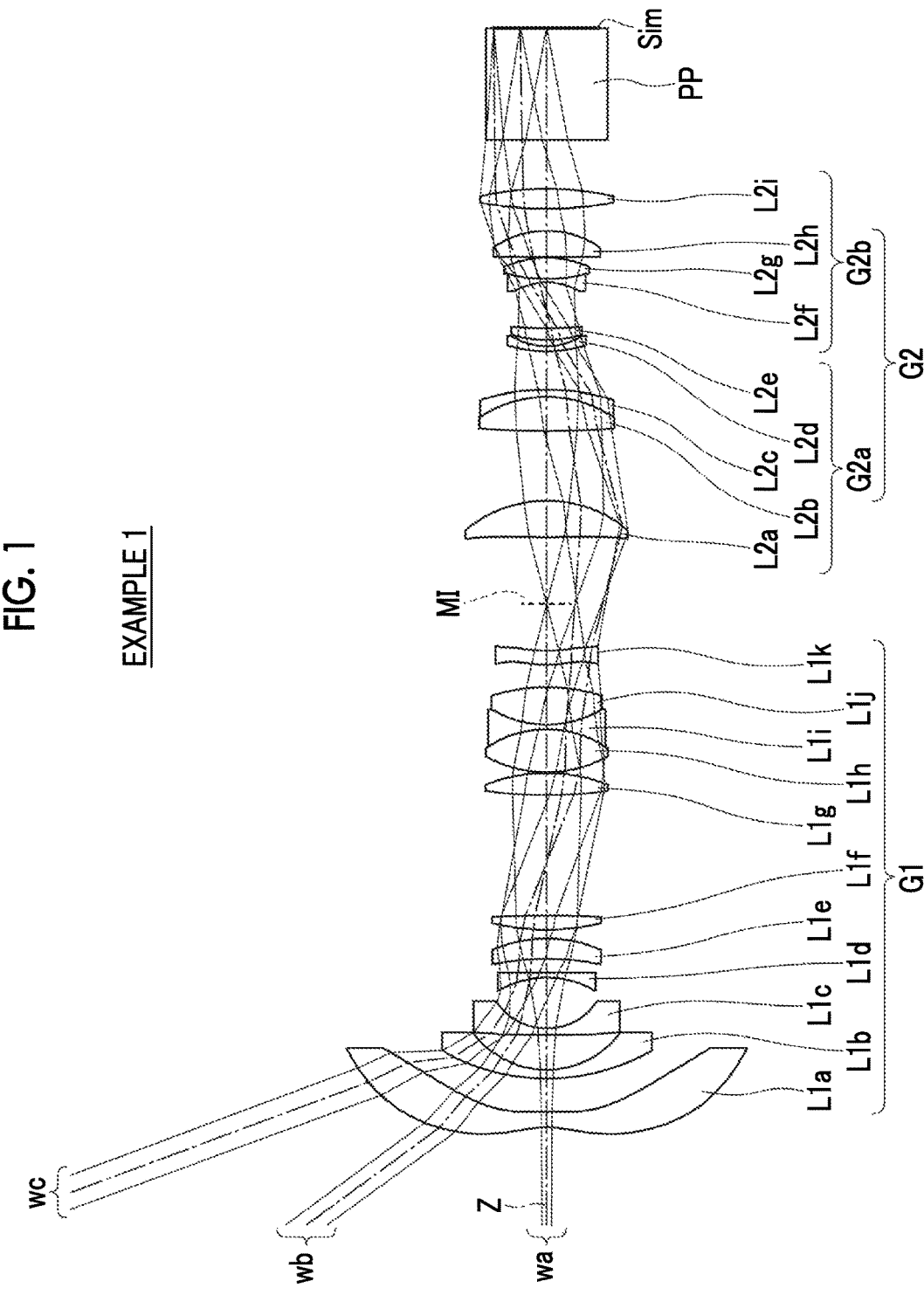
FIG. 1 is a cross-sectional view illustrating a configuration and an optical path of an imaging optical system of Example 1 of the present invention.

Hereinafter, embodiments of the present invention will be described in detail with reference to the accompanying drawings. FIG. 1 is a cross-sectional view illustrating a configuration of an imaging optical system according to an embodiment of the present invention. The configuration example shown in FIG. 1 corresponds to Example 1 described later. In FIG. 1, a left side is a magnified side, and a right side is a reduced side. In addition, in FIG. 1, an on-axis light flux wa, a light flux wb of the intermediate angle of view, and a light flux wc of the maximum angle of view are also shown together.

This imaging optical system is a system capable of projecting an image displayed on an image display surface Sim disposed on a reduced-side conjugate plane, as a magnified image, onto a magnified-side conjugate plane. Specifically, when this imaging optical system is mounted in a projection-type display apparatus, an image displayed on the image display surface Sim of a light valve can be projected, as a magnified image, onto a screen. The position of the image display surface Sim corresponds to the position of the reduced-side conjugate plane, and the position of the screen corresponds to the position of the magnified-side conjugate plane. Meanwhile, in FIG. 1, on the assumption of a case of being mounted on the projection-type display apparatus, an optical member PP having a parallel plane which is assumed to be a filter, a prism and the like which are used in a color synthesis portion or an illumination light separation portion, and the image display surface Sim of the light valve located on the surface of the optical member PP on the reduced side are also shown together. In the projection-type display apparatus, a light flux to which image information is given on the image display surface Sim is incident on this imaging optical system through the optical member PP, and is projected onto a screen, not shown, by this imaging optical system.

Meanwhile, FIG. 1 shows an example in which the position of the surface of the optical member PP on the reduced side and the position of the image display surface Sim are coincident with each other, but there is not necessarily limitation thereto. In addition, FIG. 1 shows only one image display surface Sim for the purpose of simplifying the illustration. However, in the projection-type display apparatus, a configuration may be used in which a light flux from a light source is separated into three primary colors by a color separation optical system, three light valves are disposed for the respective three primary colors, and a full color image can be displayed.

This imaging optical system consists of a first optical system G1 which is constituted by a plurality of lenses and a second optical system G2 which is constituted by a plurality of lenses and has a negative refractive power as a whole, in order from the magnified side along an optical axis Z. In the example of FIG. 1, the first optical system G1 consists of eleven lenses of lenses L1a to L1k in order from the magnified side, and the second optical system G2 consists of nine lenses of lenses L2a to L2i in order from the magnified side. However, the first optical system G1 and the second optical system G2 can also be consists of the number of lenses different from that of the example shown in FIG. 1.

The second optical system G2 is configured to form an image on the image display surface as an intermediate image MI, and the first optical system G1 is configured to form the intermediate image MI on the magnified-side conjugate plane. The second optical system G2 functions as a relay optical system. Meanwhile, in FIG. 1, only the vicinity of the optical axis of the intermediate image MI is shown by a dotted line.

In an imaging optical system constituted by only an optical system having no intermediate image formed thereon, in a case where an attempt is made to widen an angle by reducing a focal length, a lens on the magnified side becomes excessively large in any way. However, in an imaging optical system of a type in which intermediate imaging is performed as in the present embodiment, since the back focus of the first optical system G1 can be shortened, it is possible to reduce lens diameters of the first optical system G1 on the magnified side. Therefore, the system is suitable for widening an angle by reducing a focal length.

The second optical system G2 is configured to have a negative refractive power as a whole. Thereby, it is possible to reduce the lens diameters of the first optical system G1 on the magnified side.

In addition, the second optical system G2 consists of a front group G2a having a positive refractive power as a whole and a back group G2b, in order from the magnified side. The back group G2b is a lens group, including a lens on a most reduced side, which is located within the second optical system G2, and is a lens group having the maximum number of lenses included, among lens groups in which its magnified-side focal position is located closer to the magnified side than its lens surface on a most magnified side. There may be a plurality of lens groups adapted to a condition in which, in the second optical system G2, the lens on the most reduced side is included, and their magnified-side focal positions are located closer to the magnified side than their lens surfaces on the most magnified side. For example, in the example of FIG. 1, a lens group consisting of only the lens L2i, a lens group consisting of the lenses L2h and L2i, and a lens group consisting of the lenses L2f to L2i are adapted to this condition. Among these three lens groups, a lens group having the maximum number of lenses included is the lens group consisting of the lenses L2f to L2i. Therefore, the back group G2b of the example of FIG. 1 serves as a lens group consisting of four lenses of lenses L2f to L2i. The front group G2a serves as a lens group consisting of five lenses of lenses L2a to L2e.

As described above, in a case where the back group G2b is specified and the front group G2a and the back group G2b are divided into groups in the second optical system G2, a position at which a principal ray of light of an off-axis light flux and the optical axis Z intersect each other is located between the front group G2a and the back group G2b, or in the vicinity thereof. In a case where the reduced side of the second optical system G2 is configured to be telecentric, a pupil position is disposed between the front group G2a and the back group G2b, or in the vicinity thereof.

This imaging optical system is configured to satisfy all the following Conditional Expressions (1) to (3), $$4<|fG2a/f|<9 \quad (1)$$

$$1<|f2/\text{Im}\varphi|<8 \quad (2)$$

$$0.7<|f/f1|<1.1 \quad (3)$$

Here, fG2a is a focal length of the front group,
f is a focal length of the whole system
f2 is a focal length of the second optical system,
Imφ is an effective image circle diameter on the reduced side, and
f1 is a focal length of the first optical system.

The ratio value is not set to be equal to or less than the lower limit of Conditional Expression (1), and thus it is possible to prevent the relay magnification of the second optical system G2 from becoming excessively small. As a result, it is easy to perform aberration correction in the first optical system G1. In a case where the relay magnification of the second optical system G2 becomes excessively small, magnification in the first optical system G1 has to be made larger in order to secure the projection magnification of the entire system. Then, since chromatic aberration generated from the second optical system G2 to the intermediate image MI is expanded in the first optical system G1, it is difficult to perform the aberration correction in the first optical system G1. In addition, the ratio value is not set to be equal to or less than the lower limit of Conditional Expression (1), and thus it is easy to secure an angle of view while appropriately attaining the relay magnification.

The front group G2a has a positive refractive power as a whole, and the ratio value is not set to be equal to or greater than the upper limit of Conditional Expression (1), whereby it is possible to suppress the length of the front group G2a in an optical axis direction, and to prevent the length of the second optical system G2 in an optical axis direction from increasing. In addition, the ratio value is not set to be equal to or greater than the upper limit of Conditional Expression (1), and thus it is possible to prevent the lens diameter of the front group G2a from increasing while securing a small F-Number. Further, the ratio value is not set to be equal to or greater than the upper limit of Conditional Expression (1), and thus it is possible to prevent the relay magnification from becoming excessively small while realizing the back focus of the second optical system G2 having an appropriate length, or to easily secure an angle of view.

In order to enhance the effect of Conditional Expression (1), it is preferable to satisfy the following Conditional Expression (1-1), and more preferable to satisfy the following Conditional Expression (1-2), $$4<|fG2a/f|<8 \quad (1\text{-}1)$$

$$5.5<|fG2a/f|<8 \quad (1\text{-}2)$$

The ratio value is not set to be equal to or less than the lower limit of Conditional Expression (2), and thus it is possible to prevent the refractive power of lenses on the reduced side within the first optical system G1 from becoming excessively strong. Thereby, it is easy to correct field curvature. The ratio value is not set to be equal to or greater than the upper limit of Conditional Expression (2), and thus the lens diameter of the first optical system G1 on the reduced side can be made smaller than the lens diameter of the second optical system G2 on the magnified side. Therefore, even in a case where a configuration is used in which an F-Number is small, and a wide-angle lens system is formed, it is easy to reduce the entire lens diameter.

In order to enhance the effect of Conditional Expression (2), it is preferable to satisfy the following Conditional Expression (2-1), and more preferable to satisfy the following Conditional Expression (2-2), $$1.5<|f2/\text{Im}\varphi|<8 \quad (2\text{-}1)$$

$$1.9<|f2/\text{Im}\varphi|<7.5 \quad (2\text{-}2)$$

The ratio value is not set to be equal to or less than the lower limit of Conditional Expression (3), and thus the magnification of the first optical system G1 can be kept low. Therefore, it is easy to correct aberrations such as lateral chromatic aberration to a predetermined amount. The ratio value is not set to be equal to or greater than the upper limit of Conditional Expression (3), and thus the lens diameter of the first optical system G1 on the reduced side can be made smaller than the lens diameter of the second optical system G2 on the magnified side. Therefore, even in a case where a configuration is used in which an F-Number is small, and a wide-angle lens system is formed, it is easy to reduce the entire lens diameter.

In order to enhance the effect of Conditional Expression (3), it is preferable to satisfy the following Conditional Expression (3-1), and more preferable to satisfy the following Conditional Expression (3-2), $$0.7<|f/f1|<1.05 \quad (3\text{-}1)$$

$$0.75<|f/f1|<1.05 \quad (3\text{-}2)$$

In addition, it is preferable that this imaging optical system satisfies the following Conditional Expression (4), $$3<TLG2/\text{Im}\varphi<8 \quad (4)$$

Here, TLG2 is a distance on an optical axis from the surface of the second optical system on the most magnified side to the surface thereof on the most reduced side.

Im$\varphi$ is an effective image circle diameter on the reduced side.

The ratio value is not set to be equal to or less than the lower limit of Conditional Expression (4), and thus it is easy to correct spherical aberration and on-axis chromatic aberration of the second optical system G2. The ratio value is not set to be equal to or greater than the upper limit of Conditional Expression (4), and thus it is easy to suppress the entire length of the entire lens system.

In order to enhance the effect of Conditional Expression (4), it is preferable to satisfy the following Conditional Expression (4-1), and more preferable to satisfy the following Conditional Expression (4-2), $$3<TLG2/\text{Im}\varphi<7 \quad (4\text{-}1)$$

$$3.3<TLG2/\text{Im}\varphi<6.5 \quad (4\text{-}2)$$

In addition, it is preferable that this imaging optical system satisfies the following Conditional Expression (5), $$18<Bf\times\text{Im}\varphi/f^2<100 \quad (5)$$

Here, Bf is a back focus of the whole system at air conversion length,

Im$\varphi$ is an effective image circle diameter on the reduced side, and f is a focal length of the whole system.

The ratio value is not set to be equal to or less than the lower limit of Conditional Expression (5), and thus it is possible to secure the back focus of the whole system having a required length. The ratio value is not set to be equal to or greater than the upper limit of Conditional Expression (5), and thus it is easy to suppress the entire length of the entire lens system.

In order to enhance the effect of Conditional Expression (5), it is preferable to satisfy the following Conditional Expression (5-1), and more preferable to satisfy the following Conditional Expression (5-2), $$20<Bf\times\text{Im}\varphi/f^2<100 \quad (5\text{-}1)$$

$$28<Bf\times\text{Im}\varphi/f^2<100 \quad (5\text{-}2)$$

It is preferable that the lens of the second optical system G2 on the most magnified side is a positive lens. In such a case, it is possible to reduce the lens outside diameter of the second optical system G2.

In a case where the lens of the second optical system G2 on the most magnified side is a positive lens, it is preferable to satisfy the following Conditional Expression (6), $$1.55<Nd2a<2.2 \quad (6)$$

Here, Nd2a is a refractive index relating to a d line of the lens of the second optical system on the most magnified side.

The value is not set to be equal to or less than the lower limit of Conditional Expression (6), and thus it is easy to correct field curvature. The value is not set to be equal to or greater than the upper limit of Conditional Expression (6), and thus this is advantageous in the points of transmittance and cost.

In order to enhance the effect of Conditional Expression (6), it is preferable to satisfy the following Conditional Expression (6-1), and more preferable to satisfy the following Conditional Expression (6-2), $$1.60<Nd2a<2.2 \quad (6\text{-}1)$$

$$1.65<Nd2a<2.2 \quad (6\text{-}2)$$

Meanwhile, it is preferable that the refractive index relating to a d line of the whole lens of this imaging optical system is smaller than 2.2.

In addition, it is preferable that this imaging optical system satisfies the following Conditional Expression (7), $$0.05<D\text{min}/f1<10 \quad (7)$$

Here, Dmin is a distance on an optical axis between the intermediate image and a lens surface closest to the intermediate image, and f1 is a focal length of the first optical system.

The ratio value is not set to be equal to or less than the lower limit of Conditional Expression (7), and thus cracks of lenses and dust attached to lenses are not likely to be conspicuous. Thereby, it is possible to contribute to acquire a satisfactory image. The ratio value is not set to be equal to or greater than the upper limit of Conditional Expression (7), and thus this is advantageous in suppressing the entire length of the entire lens system.

In order to enhance the effect of Conditional Expression (7), it is preferable to satisfy the following Conditional Expression (7-1), $$0.05 < Dmin/f1 < 5 \quad (7\text{-}1)$$

The above-mentioned preferable configurations and available configurations can be arbitrarily combined, and it is preferable that the configurations are appropriately selectively adopted in accordance with requested specification. According to the present embodiment, it is possible to realize an imaging optical system which has a small F-Number and has satisfactory optical performance. This imaging optical system preferably has an F-Number equal to or less than 3.0, and more preferably has an F-Number equal to or less than 2.5.

Next, numerical value examples of the imaging optical system of the present invention will be described.

Example 1

A lens configuration of an imaging optical system of Example 1 is shown in FIG. 1, and a method of illustration thereof is as described. Therefore, repeated description will be omitted herein. The imaging optical system of Example 1 consists of a first optical system G1 and a second optical system G2 having a negative refractive power as a whole, in order from the magnified side. The second optical system G2 consists of a front group G2a having a positive refractive power as a whole and a back group G2b, in order from the magnified side. The second optical system forms an image on the image display surface as an intermediate image, and the first optical system G1 forms this intermediate image on the magnified-side conjugate plane. The above is a basic configuration.

The first optical system G1 consists of eleven lenses of lenses L1a to L1k in order from the magnified side, the front group G2a of the second optical system G2 consists of five lenses of lenses L2a to L2e in order from the magnified side, and the back group G2b of the second optical system G2 consists of four lenses of lenses L2f to L2i in order from the magnified side.

Table 1 shows basic lens data of the imaging optical system of Example 1, Table 2 shows various data, and Table 3 shows aspherical coefficients. The column of Si in Table 1 indicates an i-th (i=1, 2, 3, . . . ) surface number in a case where surface numbers are assigned to the surfaces of components so as to sequentially increase toward the reduced side with a surface on the magnified side of a component on the most magnified side set to a first surface, the column of Ri indicates a radius of curvature of the i-th surface, and the column of Di indicates a surface spacing on the optical axis between the i-th surface and an (i+1)-th surface. The column of Ndj in Table 1 indicates a refractive index of a j-th (j=1, 2, 3, . . . ) component relating to the d line (wavelength of 587.6 nm), where j sequentially increases toward the reduced side with the component on the most magnified side set to a first component, and the column of vdj indicates an Abbe number based on the d line of the j-th component. Here, the sign of the radius of curvature is set to be positive with respect to a surface shape with a convex surface toward the magnified side, and is set to be negative with respect to a surface shape with the convex surface toward the reduced side. In Table 1, the optical member PP is shown together.

Table 2 shows values of an absolute value |f| of the focal length of the whole system, a projection distance (distance on the optical axis from the magnified-side conjugate plane to a lens surface on the most magnified side) ProD, magnification β, an F-Number FNo., and the maximum total angle of view 2ω, on the basis of the d line. (°) in the place of 2ω means that the unit thereof is a degree. When the projection distance is a value shown in Table 2, the position of the reduced-side conjugate plane is coincident with the position of the surface of the optical member PP on the reduced side.

In Table 1, mark * is attached to the surface number of an aspherical surface, and the numerical values of a paraxial radius of curvature are written in the column of the radius of curvature of the aspherical surface. Table 3 shows an aspherical coefficient of each aspherical surface of Example 1. "E-n" (n is an integer) of the numerical value of the aspherical coefficient of Table 3 means "×10$^{-n}$". The aspherical coefficient is a value of each of coefficients KA and Am (m=3, 4, 5, . . . 16, or m=4, 6, 8, 10) in an aspherical expression represented by the following expression.

$$Zd = \frac{C \times h^2}{1 + \sqrt{1 - KA \times C^2 \times h^2}} + \sum_m Am \times h^m \quad [\text{Expression 1}]$$

Here, Zd is an aspherical depth (length of a vertical line drawn from a point on an aspherical surface having a height h down to a plane perpendicular to the optical axis with which the vertex of the aspherical surface is in contact), h is a height (distance from the optical axis to a lens surface), C is a paraxial curvature, and KA and Am are aspherical coefficients.

In data of each table, a degree is used as a unit of an angle, and mm is used as a unit of a length, but it is also possible to use other appropriate units since the optical system can be used even in a case where the system is magnified or reduced in proportion. In addition, the following each table describes numerical values rounded off to predetermined decimal places.

TABLE 1

Example 1

| Si | Ri | Di | Ndj | v dj |
|---|---|---|---|---|
| *1 | −19.5746 | 4.5008 | 1.53158 | 55.08 |
| *2 | −54.4080 | 9.4991 | | |
| 3 | 55.3474 | 2.4991 | 1.83481 | 42.72 |
| 4 | 24.0767 | 10.2533 | | |
| *5 | 0.0000 | 1.7991 | 1.71300 | 53.87 |
| 6 | 16.0184 | 14.6346 | | |
| 7 | −24.5128 | 1.3994 | 1.60311 | 60.64 |
| 8 | 0.0000 | 3.9826 | | |
| 9 | −66.8335 | 5.8246 | 1.90366 | 31.31 |
| 10 | −35.3119 | 2.4991 | | |
| 11 | 57.8465 | 4.1218 | 1.90366 | 31.31 |

TABLE 1-continued

Example 1

| Si | Ri | Di | Ndj | ν dj |
|---|---|---|---|---|
| 12 | −267.3605 | 34.6233 | | |
| 13 | 107.9692 | 6.4503 | 1.49700 | 81.61 |
| 14 | −42.9457 | 0.1990 | | |
| 15 | 32.3377 | 12.3699 | 1.59282 | 68.62 |
| 16 | −28.1690 | 1.3507 | 1.80518 | 25.46 |
| 17 | 28.1690 | 10.7505 | 1.49700 | 81.61 |
| 18 | −46.6364 | 6.4687 | | |
| *19 | 29.9708 | 3.9992 | 1.49100 | 57.58 |
| *20 | 40.5043 | 32.8004 | | |
| *21 | 326.6305 | 10.4498 | 1.70154 | 41.24 |
| 22 | −33.4253 | 19.9991 | | |
| 23 | 209.1464 | 9.8135 | 1.83481 | 42.72 |
| 24 | −31.5502 | 2.0992 | 1.89286 | 20.36 |
| 25 | −56.6556 | 11.0009 | | |
| 26 | 34.1670 | 1.4997 | 1.69895 | 30.13 |
| 27 | 17.4857 | 1.7876 | | |
| 28 | 30.6220 | 3.3355 | 1.77250 | 49.60 |
| 29 | 93.4301 | 13.3460 | | |
| 30 | −15.9721 | 0.9990 | 1.80518 | 25.46 |
| 31 | 41.1047 | 6.0591 | 1.59282 | 68.62 |
| 32 | −26.9557 | 0.1991 | | |
| 33 | 1151.3690 | 7.5632 | 1.59282 | 68.62 |
| 34 | −24.5784 | 6.3283 | | |
| 35 | 95.3771 | 5.7573 | 1.89286 | 20.36 |
| 36 | −76.7110 | 14.0117 | | |
| 37 | ∞ | 32.3000 | 1.51633 | 64.14 |
| 38 | ∞ | | | |

TABLE 2

Example 1

| |f| | 5.5249 |
|---|---|
| ProD | 710 |
| β | 132.1 |
| FNo. | 1.89 |
| 2ω(°) | 137.6 |

TABLE 3

Example 1

SURFACE NUMBER

| | 1 | 2 | 5 |
|---|---|---|---|
| KA | −1.439937803E+00 | −5.396055503E+01 | 1.000000000E+00 |
| A3 | 1.123214139E−03 | 1.396979351E−03 | |
| A4 | 1.924617974E−05 | −1.164422903E−04 | 5.599248510E−06 |
| A5 | −4.440371203E−06 | 1.024898023E−05 | |
| A6 | 1.839758741E−07 | −5.240500564E−07 | −7.151673979E−10 |
| A7 | −2.583186330E−09 | 1.411921712E−08 | |
| A8 | −4.040341821E−11 | −2.917684458E−10 | 1.092944737E−13 |
| A9 | 1.859865390E−12 | 6.260386846E−12 | |
| A10 | −1.544548967E−14 | 7.135256147E−14 | −2.523993830E−17 |
| A11 | −1.045014496E−16 | −4.894209992E−15 | |
| A12 | −3.613593417E−18 | −3.629607889E−16 | |
| A13 | 1.845868831E−19 | 2.604977959E−17 | |
| A14 | −2.031380828E−21 | −6.455541040E−19 | |
| A15 | 2.166989085E−24 | 7.408919629E−21 | |
| A16 | 5.371533698E−26 | −3.331392118E−23 | |

SURFACE NUMBER

| | 19 | 20 | 21 |
|---|---|---|---|
| KA | −5.475802775E+01 | −3.665864891E+00 | 1.000000000E+00 |
| A3 | −1.237327217E−04 | 3.748228938E−04 | |
| A4 | 2.809228669E−04 | −1.447913287E−04 | −5.182533356E−06 |
| A5 | −1.428379380E−05 | 3.857355814E−05 | |
| A6 | −7.705661125E−06 | −3.251212029E−07 | −4.482274241E−10 |

TABLE 3-continued

Example 1

| A7 | 1.225578666E−06 | −1.586723677E−06 | |
|---|---|---|---|
| A8 | −7.411692956E−08 | 2.197641701E−07 | 3.970229457E−13 |
| A9 | 8.690858761E−10 | −1.354723857E−09 | |
| A10 | 1.947947464E−10 | −1.770373594E−09 | 1.936194201E−16 |
| A11 | −2.940432133E−11 | 9.420329024E−11 | |
| A12 | 1.537092689E−12 | 5.413424061E−12 | |
| A13 | 1.860589679E−13 | −4.940094629E−13 | |
| A14 | −2.817544114E−14 | −9.035486811E−15 | |
| A15 | 1.306125165E−15 | 1.650877004E−15 | |
| A16 | −2.106808538E−17 | −3.868873801E−17 | |

Figure 4:
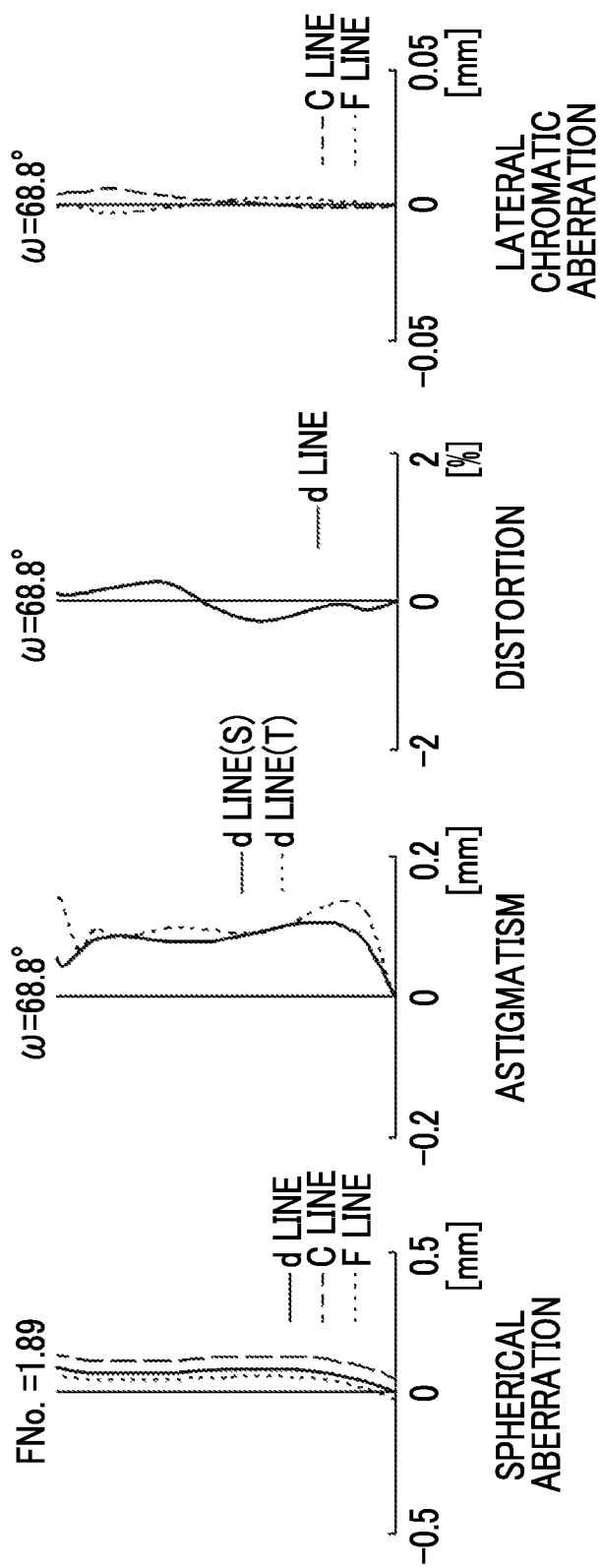
FIG. 4 is a diagram of aberrations of the imaging optical system of Example 1 of the present invention.

FIG. 4 is a collection of diagrams that illustrate aberrations, which are spherical aberration, astigmatism, distortion, and lateral chromatic aberration (chromatic aberration of magnification) of the imaging optical system of Example 1 when the projection distance is a value shown in Table 2, in order from the left side. In the spherical aberration diagram, aberrations relating to a d line (wavelength of 587.6 nm), a C line (wavelength of 656.3 nm), and an F line (wavelength of 486.1 nm) are indicated by a solid line, a long dashed line, and a short dashed line, respectively. In the astigmatism diagram, aberration relating to the d line in a sagittal direction is indicated by a solid line, and aberration relating to the d line in a tangential direction is indicated by a short dashed line. In the distortion diagram, aberration relating to the d line is indicated by a solid line. In the lateral chromatic aberration diagram, aberrations relating to the C line and the F line are indicated by a long dashed line and a short dashed line, respectively. FNo. in the spherical aberration diagram means a F-Number, and w in the other aberration diagrams mean a half angle of view.

In the description of Example 1, symbols, meanings, and description methods of the respective pieces of data are the same as those in the following examples unless otherwise noted, and thus the repeated description thereof will be omitted below.

Example 2

Figure 2:
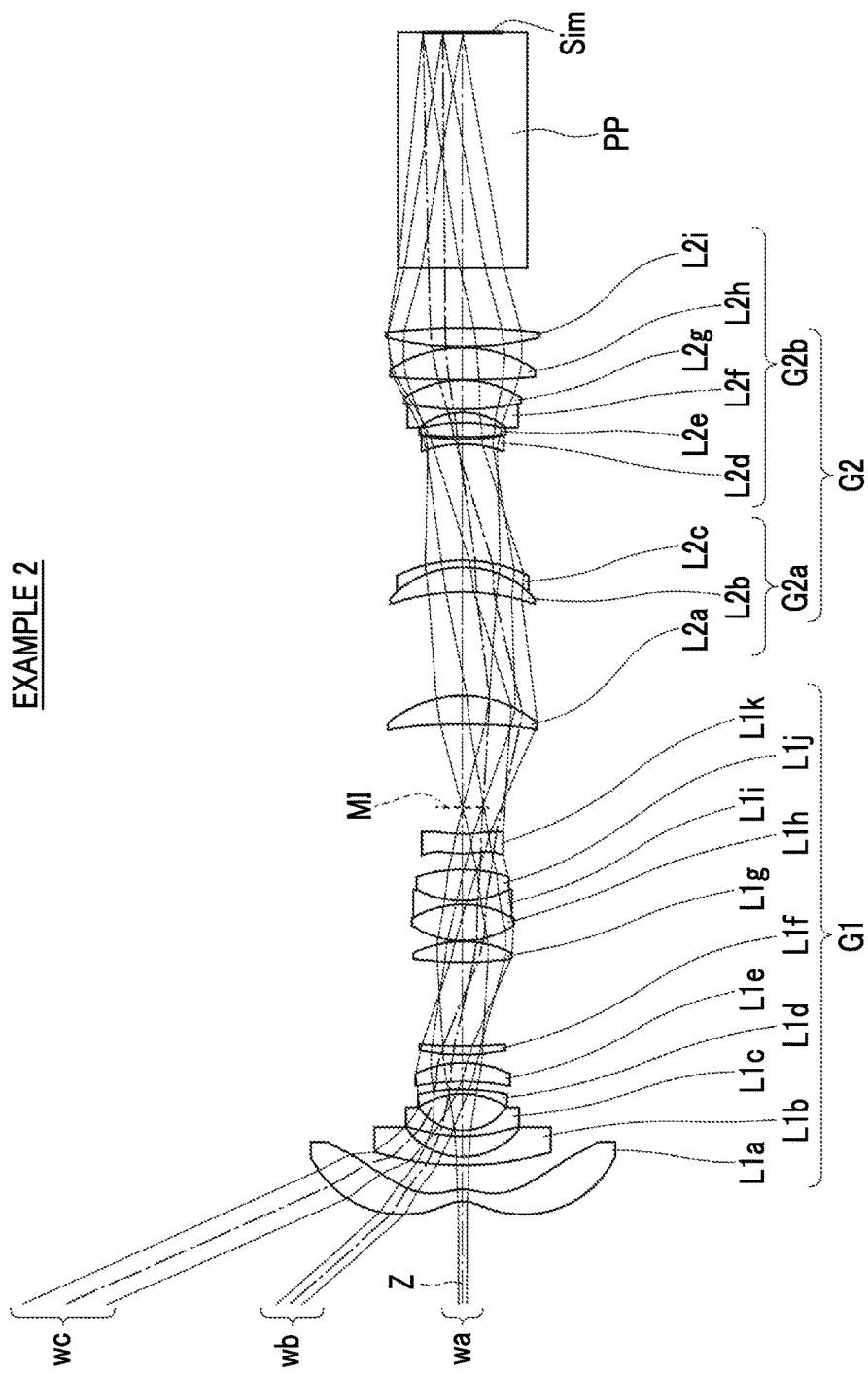
FIG. 2 is a cross-sectional view illustrating a configuration and an optical path of an imaging optical system of Example 2 of the present invention.
Figure 5:
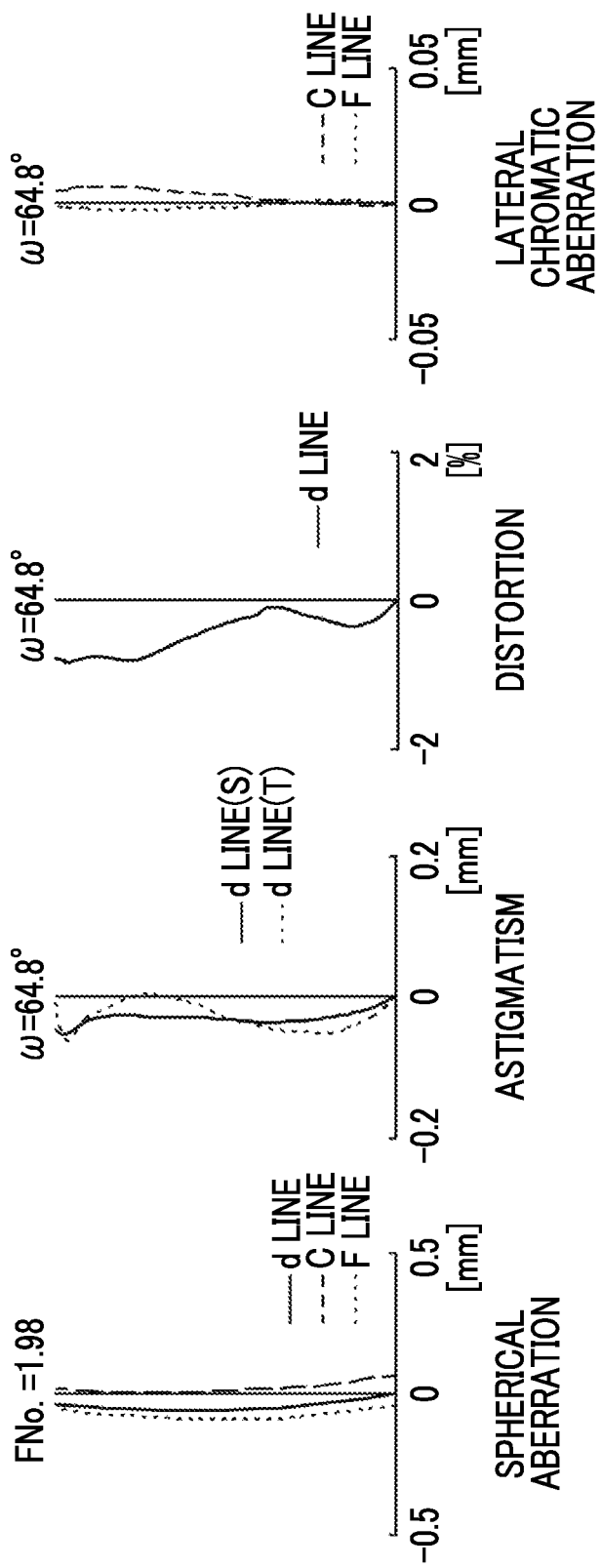
FIG. 5 is a diagram of aberrations of the imaging optical system of Example 2 of the present invention.

FIG. 2 shows a cross-sectional view of a lens configuration and an optical path of an imaging optical system of Example 2. The basic configuration of the imaging optical system of Example 2 is the same as that of Example 1. A first optical system G1 consists of eleven lenses of lenses L1a to L1k in order from the magnified side, a front group G2a of a second optical system G2 consists of three lenses of lenses L2a to L2c in order from the magnified side, and a back group G2b of the second optical system G2 consists of six lenses of lenses L2d to L2i in order from the magnified side. Table 4 shows basic lens data of the imaging optical system of Example 2, Table 5 shows various data, and Table 6 shows aspherical coefficients. When the projection distance is a value shown in Table 5, the position of the reduced-side conjugate plane is coincident with the position of the surface of the optical member PP on the reduced side. FIG. 5 shows a diagram of aberrations of the imaging optical system of Example 2 when the projection distance is a value shown in Table 5.

TABLE 4

Example 2

| Si | Ri | Di | Ndj | ν dj |
|---|---|---|---|---|
| *1 | −6.3844 | 3.6010 | 1.53158 | 55.08 |
| *2 | −9.9632 | 7.4994 | | |
| 3 | 85.5421 | 2.5005 | 1.71300 | 53.87 |
| 4 | 20.1143 | 6.3608 | | |
| *5 | 35.5193 | 1.8003 | 1.69680 | 55.53 |
| 6 | 15.0057 | 11.3123 | | |
| 7 | −22.9407 | 1.3991 | 1.59282 | 68.62 |
| 8 | −58.2228 | 2.4595 | | |
| 9 | −67.3107 | 5.7464 | 1.83481 | 42.72 |
| 10 | −30.6699 | 2.4998 | | |
| 11 | 58.6685 | 2.6358 | 1.90366 | 31.31 |
| 12 | 147.1726 | 26.1562 | | |
| 13 | 93.0136 | 6.3930 | 1.49700 | 81.54 |
| 14 | −31.0280 | 0.2002 | | |
| 15 | 25.8974 | 11.1765 | 1.59282 | 68.62 |
| 16 | −28.1690 | 1.3498 | 1.80518 | 25.46 |
| 17 | 28.1690 | 9.6111 | 1.49700 | 81.54 |
| 18 | −42.0166 | 5.0498 | | |
| *19 | 33.4464 | 6.0010 | 1.49100 | 57.58 |
| *20 | 47.1844 | 33.8319 | | |
| *21 | −219.0017 | 9.0213 | 1.83400 | 37.16 |
| 22 | −32.5684 | 32.0065 | | |
| 23 | −63.6580 | 7.7646 | 1.83481 | 42.72 |
| 24 | −28.1802 | 2.1006 | 1.84666 | 23.78 |
| 25 | −41.8317 | 35.7964 | | |
| 26 | −34.7977 | 1.4990 | 1.89286 | 20.36 |
| 27 | 55.9464 | 0.8278 | | |
| 28 | 108.9972 | 4.5019 | 1.90366 | 31.31 |
| 29 | −47.2956 | 3.1914 | | |
| 30 | −19.8064 | 1.0038 | 1.69895 | 30.13 |
| 31 | 78.8491 | 8.8829 | 1.59282 | 68.62 |
| 32 | −30.5391 | 0.1997 | | |
| 33 | 265.3196 | 9.9574 | 1.49700 | 81.54 |
| 34 | −37.5094 | 0.2003 | | |
| 35 | 91.2554 | 5.8881 | 1.89286 | 20.36 |
| 36 | −190.3385 | 18.4453 | | |
| 37 | ∞ | 73.0000 | 1.51633 | 64.14 |
| 38 | ∞ | | | |

TABLE 5

Example 2

| | |
|---|---|
| \|f\| | 5.4828 |
| ProD | 710 |
| β | 132.1 |
| FNo. | 1.98 |
| 2ω(°) | 129.6 |

TABLE 6

Example 2

| | SURFACE NUMBER | | |
|---|---|---|---|
| | 1 | 2 | 5 |
| KA | −1.762574479E+00 | −3.948303644E+00 | 1.000000000E+00 |
| A3 | 2.341641899E−03 | 1.857823304E−03 | |
| A4 | −2.168564169E−05 | −4.042122645E−05 | −1.892017932E−05 |
| A5 | −1.158971105E−05 | 2.340227731E−05 | |
| A6 | 9.492569075E−07 | −3.731605849E−06 | 1.070373098E−08 |
| A7 | −3.651209106E−08 | 2.377828953E−07 | |
| A8 | 6.283036594E−10 | −6.778995393E−09 | 1.192117171E−11 |
| A9 | 1.091369086E−11 | 6.208627231E−11 | |
| A10 | −1.127869672E−12 | −1.191185689E−12 | 1.615608650E−15 |
| A11 | 3.991056837E−14 | 1.548338887E−13 | |
| A12 | −8.362634774E−16 | −4.781380761E−15 | |
| A13 | 1.054357893E−17 | 1.226781586E−17 | |
| A14 | −7.129531196E−20 | 1.900595378E−18 | |
| A15 | 1.770539020E−22 | −3.549780231E−20 | |
| A16 | 1.275920991E−25 | 2.032349459E−22 | |

| | SURFACE NUMBER | | |
|---|---|---|---|
| | 19 | 20 | 21 |
| KA | −2.811079643E+01 | 6.117107563E+00 | 1.000000000E+00 |
| A3 | 2.618244629E−04 | −3.038708695E−04 | |
| A4 | −1.797704590E−05 | 2.002397248E−04 | −1.796231891E−06 |
| A5 | −1.211955387E−05 | 6.917182193E−07 | |
| A6 | 7.854495304E−06 | −1.191935543E−05 | −3.051151602E−09 |
| A7 | −2.615535228E−06 | 1.857309005E−06 | |
| A8 | 2.627605878E−07 | −9.713763453E−08 | 1.342699602E−12 |
| A9 | 1.343656221E−08 | −2.737894216E−09 | |
| A10 | −4.425421214E−09 | 3.131968489E−10 | 4.605173808E−16 |
| A11 | 2.065535536E−10 | 1.703990736E−11 | |
| A12 | 8.470030072E−12 | −1.145836040E−12 | |
| A13 | 9.069428403E−14 | 5.023959680E−14 | |
| A14 | −1.435607631E−13 | −1.945326094E−14 | |
| A15 | 9.152103329E−15 | 1.632151335E−15 | |
| A16 | −1.756585341E−16 | −3.985061467E−17 | |

Example 3

Figure 3:
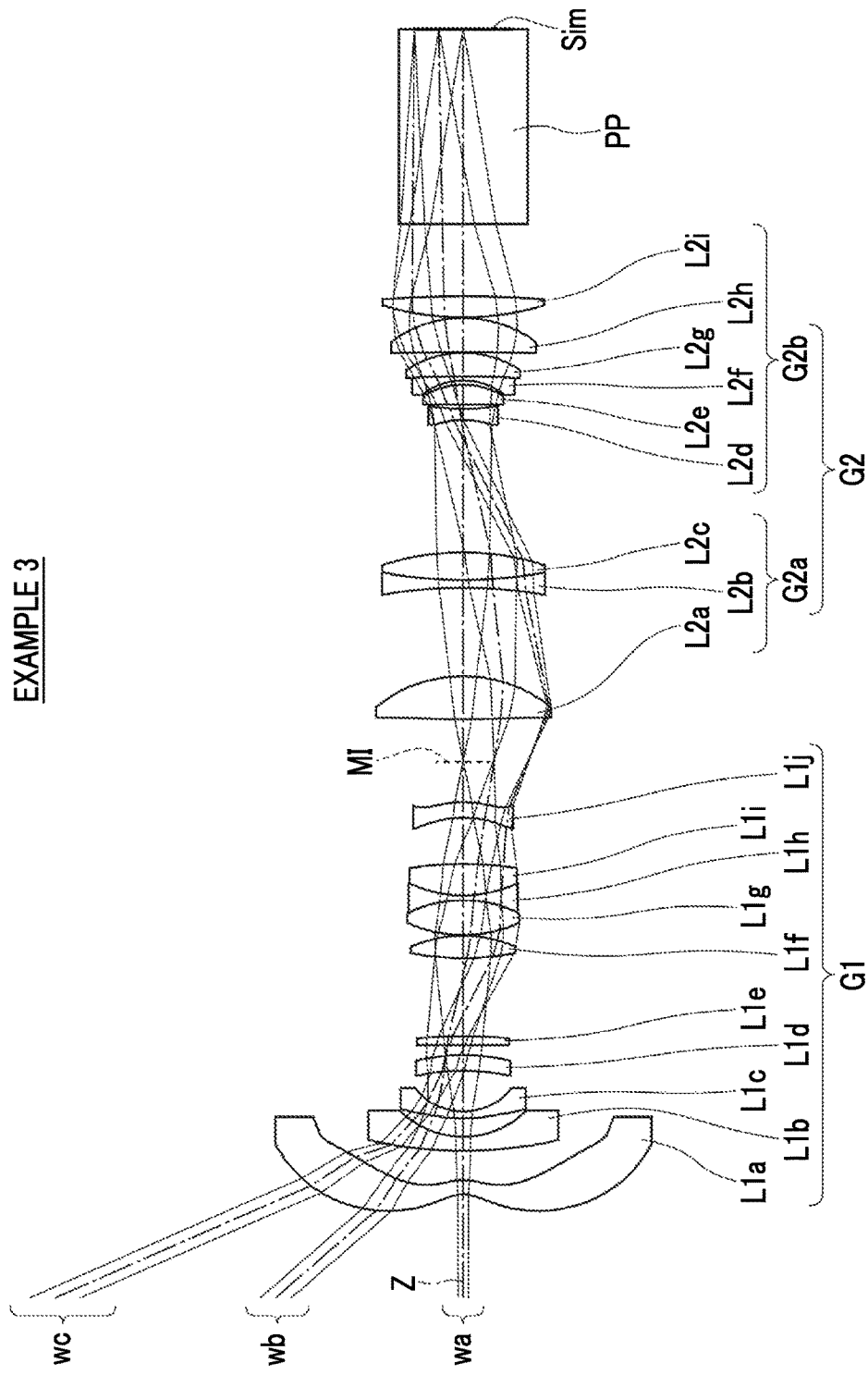
FIG. 3 is a cross-sectional view illustrating a configuration and an optical path of an imaging optical system of Example 3 of the present invention.
Figure 6:
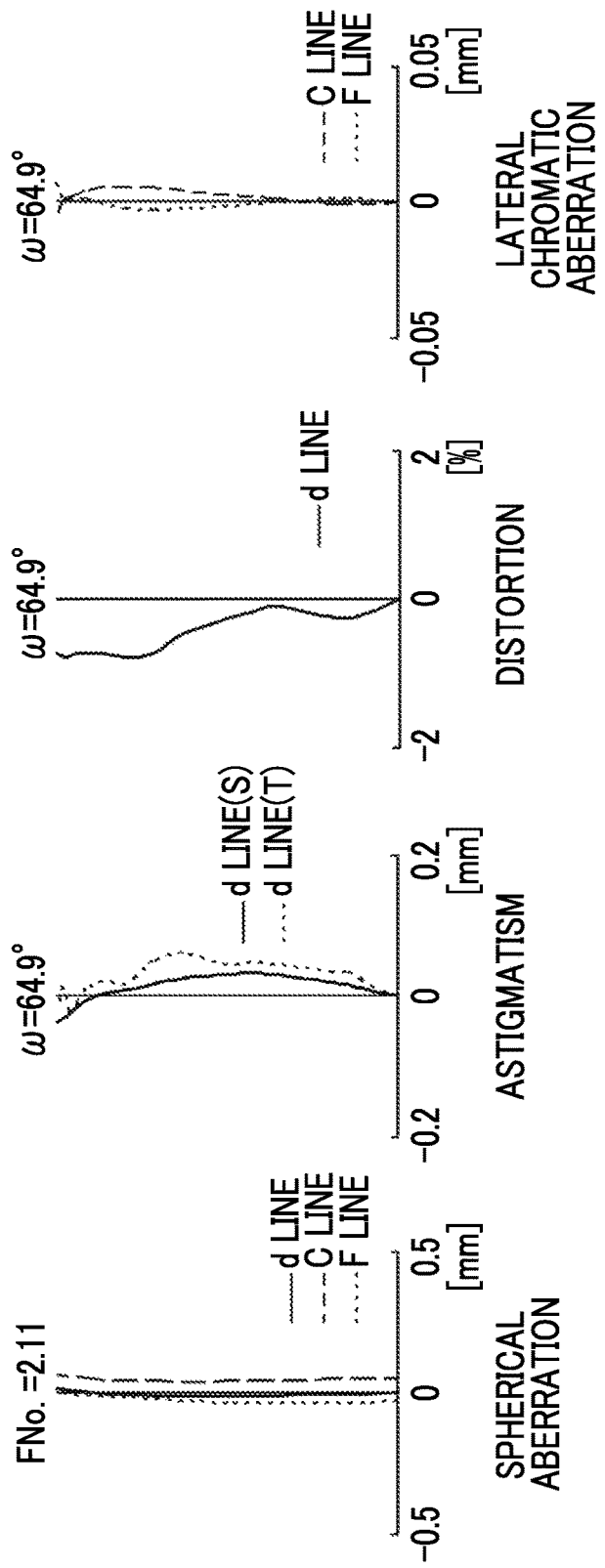
FIG. 6 is a diagram of aberrations of an imaging optical system of Example 3 of the present invention.

FIG. 3 shows a cross-sectional view of a lens configuration and an optical path of an imaging optical system of Example 3. The basic configuration of the imaging optical system of Example 3 is the same as that of Example 1. A first optical system G1 consists of ten lenses of lenses L1a to L1j in order from the magnified side, a front group G2a of a second optical system G2 consists of three lenses of lenses L2a to L2c in order from the magnified side, and a back group G2b of the second optical system G2 consists of six lenses of lens L2d to L2i in order from the magnified side. Table 7 shows basic lens data of the imaging optical system of Example 3, Table 8 shows various data, and Table 9 shows aspherical coefficients. When the projection distance is a value shown in Table 8, the position of the reduced-side conjugate plane is coincident with the position of the surface of the optical member PP on the reduced side. FIG. 6 shows a diagram of aberrations of the imaging optical system of Example 3 when the projection distance is a value shown in Table 8.

TABLE 7

Example 3

| Si  | Ri        | Di      | Ndj     | v dj  |
|-----|-----------|---------|---------|-------|
| *1  | −6.0037   | 3.5994  | 1.53158 | 55.08 |
| *2  | −9.6692   | 7.5001  |         |       |
| 3   | 96.4086   | 3.5912  | 1.71300 | 53.87 |
| 4   | 20.3642   | 4.6558  |         |       |
| *5  | 31.6359   | 1.7991  | 1.69680 | 55.53 |
| 6   | 13.7757   | 10.5318 |         |       |
| 7   | −50.7988  | 4.0621  | 1.80400 | 46.58 |
| 8   | −42.6551  | 2.4997  |         |       |
| 9   | −4571.9307| 2.2885  | 1.80400 | 46.58 |
| 10  | −113.2272 | 19.9995 |         |       |
| 11  | 62.9092   | 5.7134  | 1.49700 | 81.54 |

TABLE 7-continued

Example 3

| Si  | Ri        | Di      | Ndj     | v dj  |
|-----|-----------|---------|---------|-------|
| 12  | −29.0903  | 0.2006  |         |       |
| 13  | 30.4326   | 8.9026  | 1.60300 | 65.44 |
| 14  | −28.1690  | 1.3501  | 1.80518 | 25.46 |
| 15  | 28.1690   | 8.0771  | 1.69680 | 55.53 |
| 16  | −73.9394  | 11.9680 |         |       |
| *17 | −22.2911  | 4.0007  | 1.49100 | 57.58 |
| *18 | −19.1034  | 21.1265 |         |       |
| *19 | 161.1602  | 11.0338 | 1.68893 | 31.07 |
| 20  | −31.6689  | 22.6293 |         |       |
| 21  | −108.9439 | 2.0099  | 1.49700 | 81.54 |
| 22  | 99.7370   | 7.2116  | 1.90366 | 31.31 |
| 23  | −59.4708  | 33.8463 |         |       |
| 24  | −19.9553  | 2.8799  | 1.67270 | 32.10 |
| 25  | 47.7516   | 1.1154  |         |       |
| 26  | −651.3758 | 5.0311  | 1.59282 | 68.62 |
| 27  | −17.4800  | 1.099   |         |       |
| 28  | −14.8449  | 0.9992  | 1.80809 | 22.76 |
| 29  | −233.6406 | 6.0626  | 1.60300 | 65.44 |
| 30  | −23.2241  | 0.2007  |         |       |
| 31  | −575.5237 | 8.7163  | 1.59282 | 68.62 |
| 32  | −27.4916  | 0.1996  |         |       |
| 33  | 63.6867   | 5.4945  | 1.89286 | 20.36 |
| 34  | −260.5548 | 18.5051 |         |       |
| 35  | ∞         | 50.0000 | 1.51633 | 64.14 |
| 36  | ∞         |         |         |       |

TABLE 8

Example 3

| |f|    | 5.4783 |
|--------|--------|
| ProD   | 710    |
| β      | 132.1  |
| FNo.   | 2.11   |
| 2ω(°)  | 129.8  |

TABLE 9

Example 3

| | SURFACE NUMBER | | |
|---|---|---|---|
| | 1 | 2 | 5 |
| KA  | −1.609015543E+00 | −3.853348402E+00 | 1.000000000E+00 |
| A3  | 2.696947412E−03  | 2.048917128E−03  |                 |
| A4  | −4.708905968E−05 | −4.091996327E−05 | −4.158365010E−05 |
| A5  | −1.121916246E−05 | 2.174912735E−05  |                 |
| A6  | 9.261167429E−07  | −3.234642508E−06 | 6.346415846E−08 |
| A7  | −3.053132089E−08 | 1.448351584E−07  |                 |
| A8  | 2.774197006E−10  | 1.870335440E−09  | 1.347146047E−12 |
| A9  | 1.202808123E−11  | −3.525814219E−10 |                 |
| A10 | −3.993106297E−13 | 7.840963647E−12  | −2.568431275E−14 |
| A11 | 2.992348863E−15  | 1.170144381E−13  |                 |
| A12 | 3.822237135E−17  | −1.042716044E−15 |                 |
| A13 | −3.218919233E−21 | −4.591087076E−16 |                 |
| A14 | −2.555650564E−20 | 1.973231953E−17  |                 |
| A15 | 3.999924862E−22  | −3.370422568E−19 |                 |
| A16 | −1.925533874E−24 | 2.190856417E−21  |                 |

| | SURFACE NUMBER | | |
|---|---|---|---|
| | 17 | 18 | 19 |
| KA | −2.458468092E+00 | −3.102770705E+01 | 1.000000000E+00 |
| A3 | −1.403382622E−04 | −5.139901573E−04 |                 |
| A4 | −3.267332951E−08 | −2.785929736E−04 | −4.702958906E−06 |
| A5 | 2.468665204E−08  | 3.242704939E−06  |                 |
| A6 | −1.130537324E−08 | 1.540077409E−05  | 8.925770924E−10 |
| A7 | 3.757039530E−09  | −1.967755169E−06 |                 |
| A8 | −9.938343828E−10 | 7.585592366E−09  | −1.791411748E−12 |

TABLE 9-continued

| | Example 3 | | |
|---|---|---|---|
| A9 | 2.082071139E−10 | 9.461359014E−09 | |
| A10 | −3.249612807E−11 | 1.577327081E−10 | −2.751619281E−16 |
| A11 | 3.519316408E−12 | −2.571173341E−11 | |
| A12 | −2.417779291E−13 | −6.745501105E−12 | |
| A13 | 8.518755227E−15 | 2.427729707E−13 | |
| A14 | 1.133185026E−17 | 6.345724997E−14 | |
| A15 | −1.154748190E−17 | −5.214576701E−15 | |
| A16 | 2.784988246E−19 | 1.156484306E−16 | |

Table 10 shows values corresponding to Conditional Expressions (1) to (7) of the imaging optical systems of Examples 1 to 3 and values relevant to these corresponding values. In Table 10, a distance on the optical axis from a lens surface immediately before the magnified side of the intermediate image MI to the intermediate image MI is set to Dmin1, and a distance on the optical axis from the intermediate image MI to a lens surface immediately after the reduced side of the intermediate image MI is set to Dmin2 Values shown in Table 10 are based on the d line.

TABLE 10

| EXPRESSION NUMBER | | EXAMPLE 1 | EXAMPLE 2 | EXAMPLE 3 |
|---|---|---|---|---|
| (1) | \|fG2a/f\| | 6.01 | 6.07 | 6.25 |
| (2) | \|f2/Im ø\| | 7.41 | 6.12 | 2.27 |
| (3) | \|f/f1\| | 0.93 | 0.97 | 0.79 |
| (4) | TLG2/Im ø | 3.46 | 5.25 | 4.64 |
| (5) | Bf × Im ø/f² | 33.51 | 51.77 | 40.14 |
| (6) | Nd2a | 1.70154 | 1.83400 | 1.68893 |
| (7) | Dmin/f1 | 2.40 | 1.49 | 1.46 |

| | EXAMPLE 1 | EXAMPLE 2 | EXAMPLE 3 |
|---|---|---|---|
| fG2a | 33.19 | 33.26 | 34.24 |
| f2 | −214.91 | −143.16 | −53.04 |
| Im ø | 29.00 | 23.40 | 11.70 |
| f1 | 5.94 | 5.63 | 6.92 |
| TLG2 | 100.24 | 122.84 | 108.53 |
| Bf | 35.27 | 66.50 | 51.48 |
| Dmin1 | 14.24 | 8.40 | 11.00 |
| Dmin2 | 18.56 | 25.43 | 10.13 |
| Dmin | 14.24 | 8.40 | 10.13 |

As can be seen from the above-mentioned data, the imaging optical systems of Examples 1 to 3 is configured such that the F-Number is in a range of 1.89 to 2.11 to have a small F-Number, the total angle of view is equal to or greater than 120° to form a wide angle, and that high optical performance is realized by satisfactory correction of each aberration.

Figure 7:
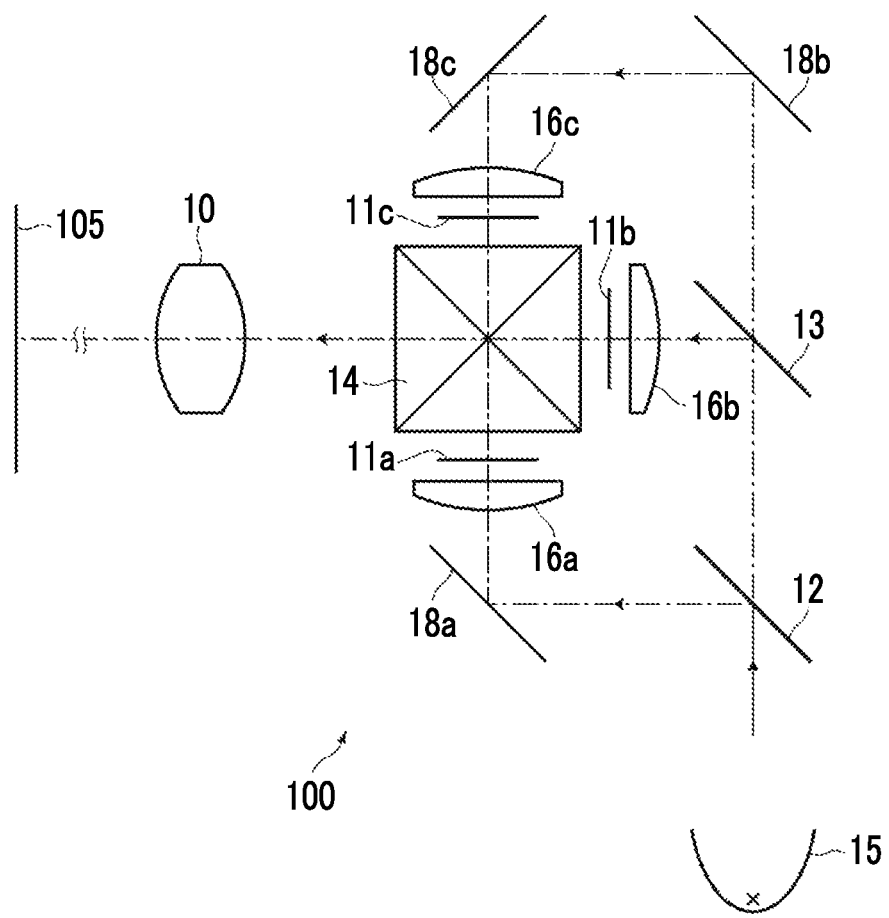
FIG. 7 is a schematic configuration diagram of a projection-type display apparatus according to an embodiment of the present invention.

Next, a projection-type display apparatus according to an embodiment of the present invention will be described. FIG. 7 is a schematic configuration diagram of a projection-type display apparatus according to the embodiment of the present invention. A projection-type display apparatus 100 shown in FIG. 7 includes an imaging optical system 10 according to an embodiment of the present invention, a light source 15, transmission-type display devices 11a to 11c as light valves corresponding to respective beams of colored light, dichroic mirrors 12 and 13 for color decomposition, a cross dichroic prism 14 for color synthesis, condenser lenses 16a to 16c, and total reflection mirrors 18a to 18c for deflecting an optical path. Meanwhile, in FIG. 7, the imaging optical system 10 is schematically shown. In addition, an integrator is disposed between the light source 15 and the dichroic mirror 12, but is not shown in FIG. 7.

White light from the light source 15 is decomposed into three colored light fluxes (G light, B light, and R light) by the dichroic mirrors 12 and 13. The decomposed light fluxes are then incident on the transmission-type display devices 11a to 11c corresponding to the respective colored light fluxes through the condenser lenses 16a to 16c, respectively, and are optically modulated. The modulated light fluxes are color-synthesized by the cross dichroic prism 14, and then are incident on the imaging optical system 10. The imaging optical system 10 projects an optical image of light optically modulated by the transmission-type display devices 11a to 11c onto a screen 105.

Figure 8:
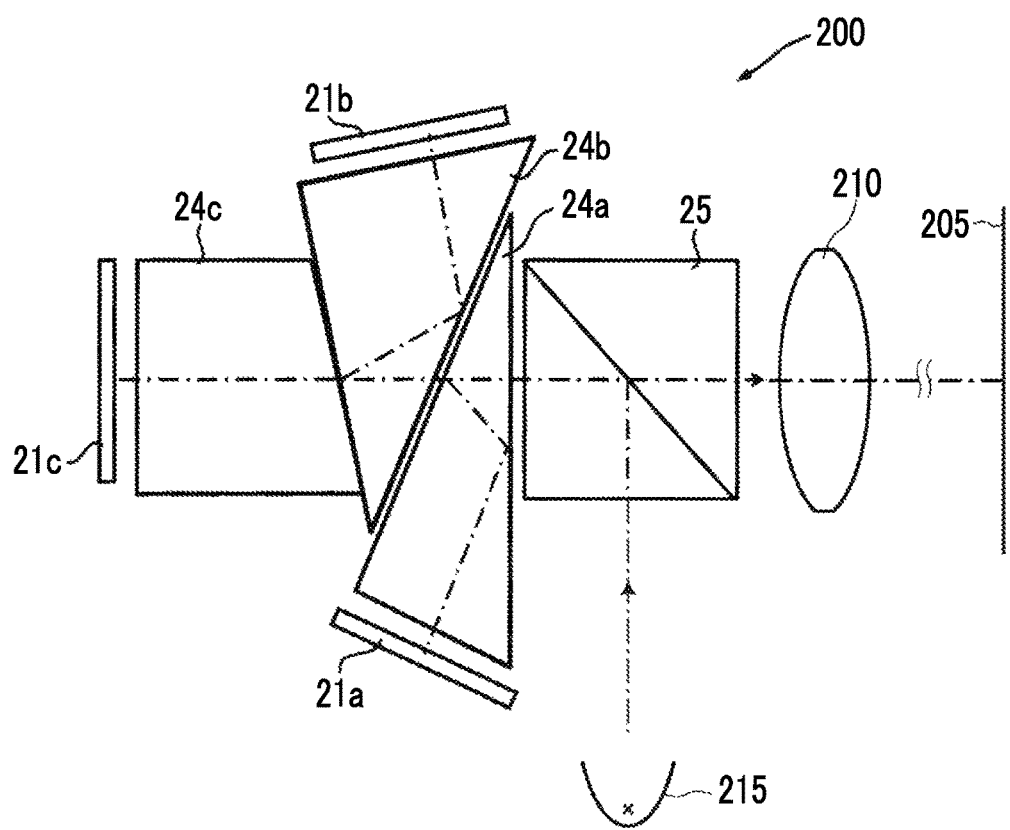
FIG. 8 is a schematic configuration diagram of a projection-type display apparatus according to another embodiment of the present invention.

FIG. 8 is a schematic configuration diagram of a projection-type display apparatus according to another embodiment of the present invention. A projection-type display apparatus 200 shown in FIG. 8 includes an imaging optical system 210 according to the embodiment of the present invention, a light source 215, DMDs 21a to 21c as light valves corresponding to respective beams of colored light, total internal reflection (TIR) prisms 24a to 24c for color decomposition and color synthesis, and a polarization separation prism 25 that separates illumination light and projected light. Meanwhile, in FIG. 8, the imaging optical system 210 is schematically shown. In addition, an integrator is disposed between the light source 215 and the polarization separation prism 25, but is not shown in FIG. 8.

White light from the light source 215 is reflected from a reflecting surface inside the polarization separation prism 25, and then is decomposed into three colored light fluxes (G light, B light, and R light) by the TIR prisms 24a to 24c. The respective colored light fluxes after the decomposition are incident on the DMDs 21a to 21c corresponding thereto and are optically modulated. The modulated light fluxes travel through the TIR prisms 24a to 24c again in an opposite direction and are color-synthesized. The synthesized light passes through the polarization separation prism 25 and is incident on the imaging optical system 210. The imaging optical system 210 projects an optical image of light optically modulated by the DMDs 21a to 21c onto a screen 205.

Figure 9:
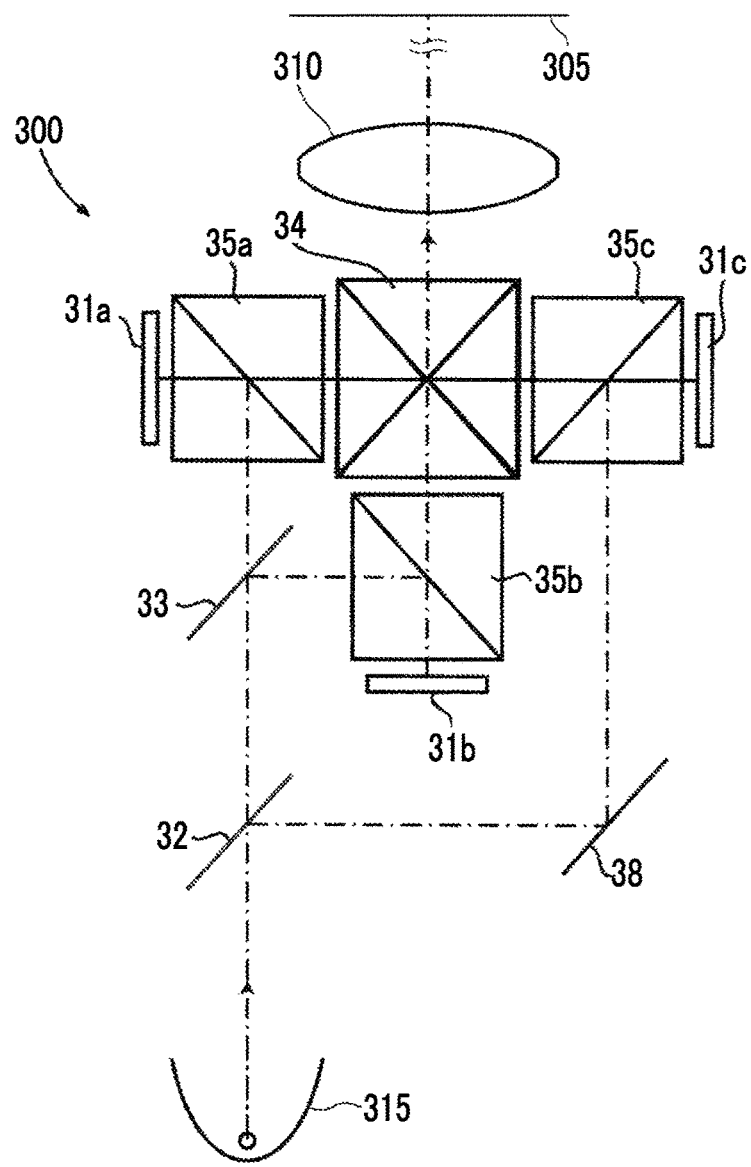
FIG. 9 is a schematic configuration diagram of a projection-type display apparatus according to still another embodiment of the present invention.

FIG. 9 is a schematic configuration diagram of a projection-type display apparatus according to still another embodiment of the present invention. A projection-type display apparatus 300 shown in FIG. 9 includes an imaging optical system 310 according to the embodiment of the present invention, a light source 315, reflection-type display devices 31a to 31c as light valves corresponding to respective beams of colored light, dichroic mirrors 32 and 33 for color separation, a cross dichroic prism 34 for color synthesis, a total reflection mirror 38 for optical path deflection, and polarization separation prisms 35a to 35c. Meanwhile, in FIG. 9, the imaging optical system 310 is schematically shown. In addition, an integrator is disposed between the light source 315 and the dichroic mirror 32, but is not shown in FIG. 9.

White light from light source 315 is decomposed into three colored light fluxes (G light, B light, and R light) by the dichroic mirrors 32 and 33. The respective colored light fluxes after the decomposition are incident on the reflection-type display devices 31a to 31c corresponding to the respective colored light fluxes through the polarization separation prisms 35a to 35c, respectively, and are optically modulated. The modulated light fluxes are color-synthesized by the cross dichroic prism 34, and then are incident on the imaging optical system 310. The imaging optical system 310 projects an optical image of light optically modulated by the reflection-type display devices 31a to 31c onto a screen 305.

Figure 10:
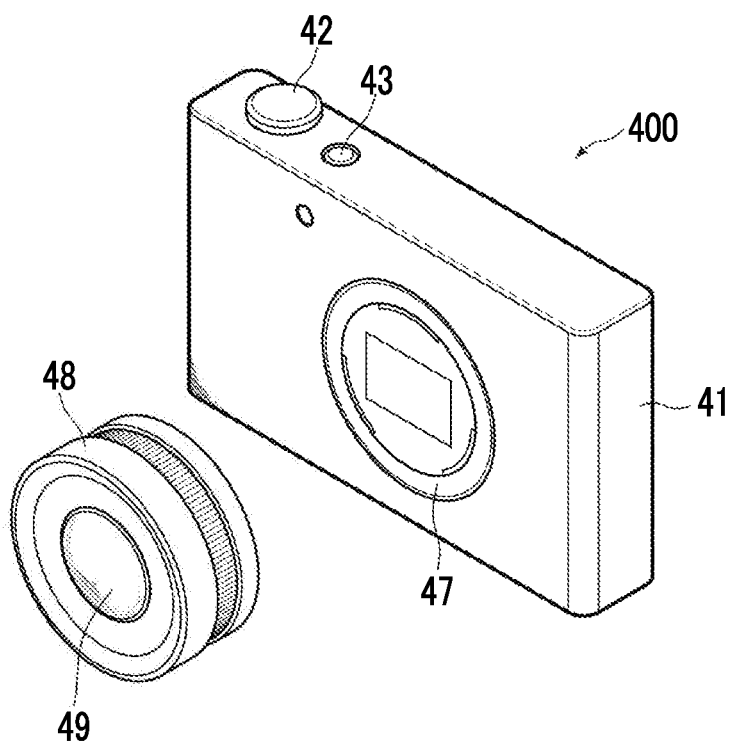
FIG. 10 is a perspective view of the front side of an imaging apparatus according to an embodiment of the present invention.
Figure 11:
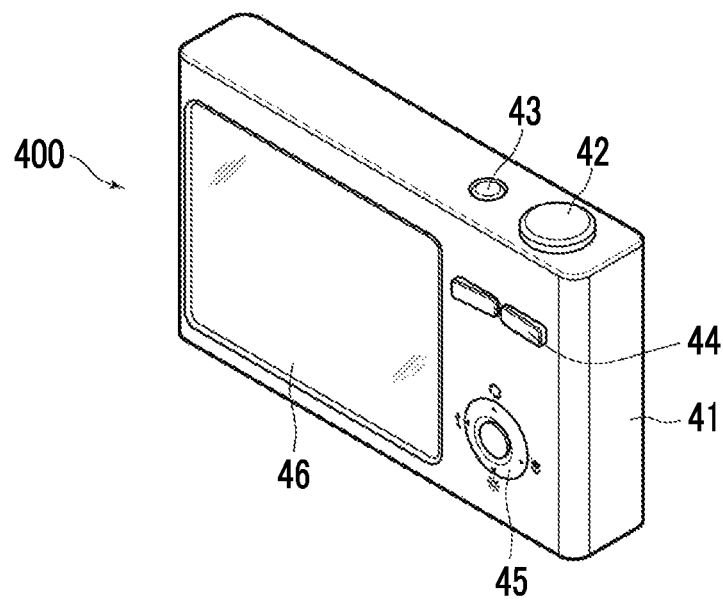
FIG. 11 is a perspective view of the rear surface side of the imaging apparatus shown in FIG. 10.

FIGS. 10 and 11 are appearance diagrams of a camera 400 which is an imaging apparatus of an embodiment of the present invention. FIG. 10 shows a perspective view when the camera 400 is seen from the front side, and FIG. 11 is a perspective view when the camera 400 seen from the rear surface side. The camera 400 is a single-lens digital camera, having no reflex finder, which has an interchangeable lens 48 detachably mounted therein. The interchangeable lens 48 has an imaging optical system 49 which is an optical system according to the embodiment of the present invention housed within a lens barrel.

This camera 400 includes a camera body 41, and is provided with a shutter button 42 and a power button 43 on the upper surface of the camera body 41. In addition, operating portions 44 and 45 and a display portion 46 are provided on the rear surface of the camera body 41. The display portion 46 is used for displaying a captured image or an image within an angle of view before image capture.

An imaging aperture on which light from an imaging target is incident is provided on the front central portion of the camera body 41, a mount 47 is provided at a position corresponding to the imaging aperture, and the interchangeable lens 48 is mounted onto the camera body 41 through the mount 47.

The camera body 41 is provided therein with an imaging device (not shown) such as a charge coupled device (CCD) that outputs an imaging signal according to a subject image formed by the interchangeable lens 48, a signal processing circuit that processes the imaging signal which is output from the imaging device to generate an image, a recording medium for recording the generated image, and the like. In this camera 400, a still image or a moving image can be captured by pressing the shutter button 42, and image data obtained by this image capture is recorded in the recording medium.

Hereinbefore, the present invention has been described through embodiments and examples, but the present invention is not limited to the above-described embodiments and examples, and can be variously modified. For example, the radius of curvature, the surface spacing, the refractive index, the Abbe number, the aspherical coefficient, and the like of each lens are not limited to the values shown in each of the numerical value examples, and other values can be used therefor.

In addition, the projection-type display apparatuses of the present invention are also not limited to the above configurations. For example, the light valves which are used and the optical members which are used for light flux separation or light flux synthesis are not limited to the above configurations, and can be modified in various forms.

In addition, the imaging apparatus of the present invention is also not limited to the above configuration, and can be applied to, for example, a single-lens reflex camera, a film camera, a video camera, and the like.

What is claimed is:

1. An imaging optical system capable of projecting an image displayed on an image display surface on a reduced-side conjugate plane, as a magnified image, onto a magnified-side conjugate plane, the system consisting of, in order from a magnified side:
   a first optical system which is constituted by a plurality of lenses; and
   a second optical system which is constituted by a plurality of lenses and has a negative refractive power as a whole,
   wherein the second optical system forms the image on the image display surface as an intermediate image,
   the first optical system forms the intermediate image on the magnified-side conjugate plane,
   the second optical system consists of a front group having a positive refractive power as a whole and a back group, in order from the magnified side,
   the back group is a lens group having the maximum number of lenses included, among lens groups in which its magnified-side focal position is located closer to the magnified side than its lens surface on a most magnified side, and
   all the following Conditional Expressions (1) to (3) are satisfied, $$4 < |fG2a/f| < 9 \qquad (1)$$

$$1 < |f2/\text{Im}\varphi| < 8 \qquad (2)$$

$$0.7 < |f/f1| < 1.1 \qquad (3)$$

where fG2a is a focal length of the front group,
f is a focal length of the whole system,
f2 is a focal length of the second optical system,
Imφ is an effective image circle diameter on the reduced side, and
f1 is a focal length of the first optical system.

2. The imaging optical system according to claim 1, wherein the following Conditional Expression (4) is satisfied, $$3 < TLG2/\text{Im}\varphi < 8 \qquad (4)$$

where TLG2 is a distance on an optical axis from a surface of the second optical system on the most magnified side to a surface thereof on a most reduced side.

3. The imaging optical system according to claim 2, wherein the following Conditional Expression (4-1) is satisfied, $$3 < TLG2/\text{Im}\varphi < 7 \qquad (4\text{-}1).$$

4. The imaging optical system according to claim 1, wherein the following Conditional Expression (5) is satisfied, $$18 < Bf \times \text{Im}\varphi/f^2 < 100 \qquad (5),$$

where Bf is a back focus of the whole system at air conversion length.

5. The imaging optical system according to claim 4, wherein the following Conditional Expression (5-1) is satisfied, $$20 < Bf \times \text{Im}\varphi/f^2 < 100 \qquad (5\text{-}1).$$

6. The imaging optical system according to claim 1, wherein a lens of the second optical system on the most magnified side is a positive lens.

7. The imaging optical system according to claim 6, wherein the following Conditional Expression (6) is satisfied, $$1.55 < Nd2a < 2.2 \qquad (6)$$

where Nd2a is a refractive index relating to a d line of the lens of the second optical system on the most magnified side.

8. The imaging optical system according to claim 7, wherein the following Conditional Expression (6-1) is satisfied, $$1.60 < Nd2a < 2.2 \qquad (6\text{-}1)$$

9. The imaging optical system according to claim 1, wherein the following Conditional Expression (7) is satisfied, $$0.05 < D\min/f1 < 10 \qquad (7)$$

where Dmin is a distance on an optical axis between the intermediate image and a lens surface closest to the intermediate image.

10. The imaging optical system according to claim 9, wherein the following Conditional Expression (7-1) is satisfied, $$0.05 < D\min/f1 < 5 \qquad (7\text{-}1)$$

11. The imaging optical system according to claim 1, wherein the following Conditional Expression (1-1) is satisfied, $$4 < |fG2a/f| < 8 \qquad (1\text{-}1)$$

12. The imaging optical system according to claim 1, wherein the following Conditional Expression (2-1) is satisfied, $$1.5 < |f2/\text{Im}\varphi| < 8 \qquad (2\text{-}1)$$

13. The imaging optical system according to claim 1, wherein the following Conditional Expression (3-1) is satisfied, $$0.7 < |f/f1| < 1.05 \qquad (3\text{-}1)$$

14. A projection-type display apparatus comprising:
a light source;
a light valve on which light from the light source is incident; and
the imaging optical system according to claim 1 as an imaging optical system that projects an optical image of light optically modulated by the light valve onto a screen.

15. An imaging apparatus comprising the imaging optical system according to claim 1.

* * * * *